G. E. BLAYLOCK.
TIRE REPAIR METHOD.
APPLICATION FILED JULY 8, 1918.
1,281,757.
Patented Oct. 15, 1918.
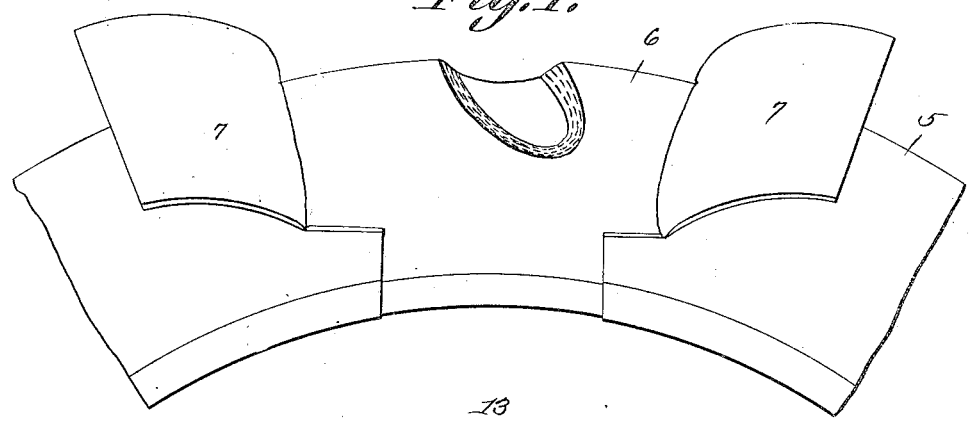
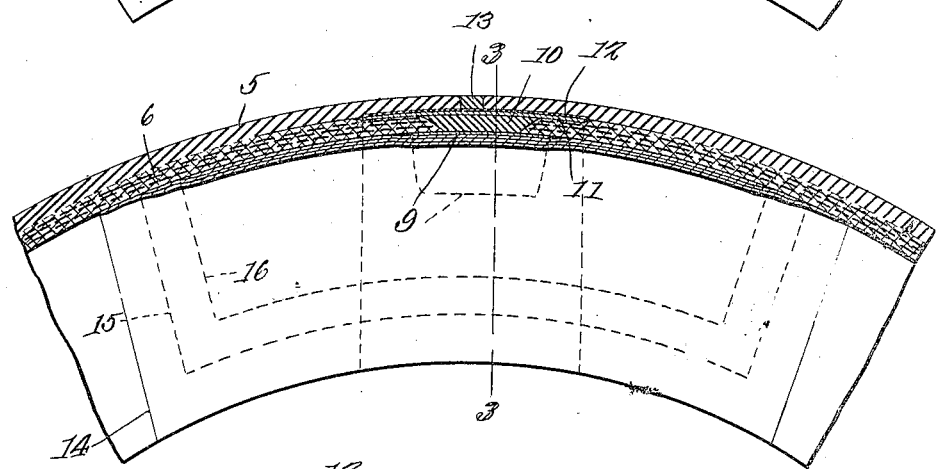
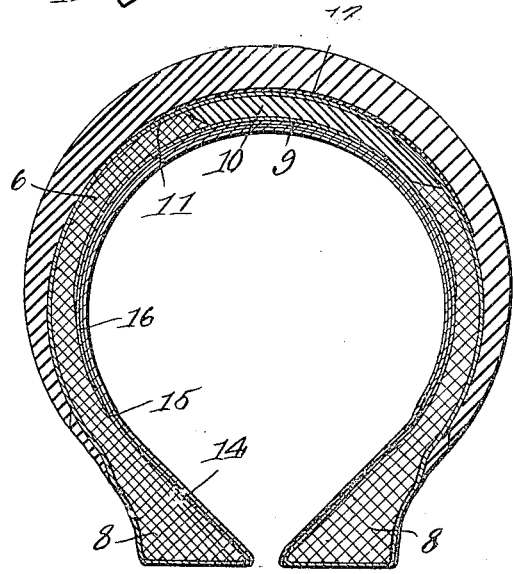
Inventor,
Gifford E. Blaylock
By Henry J. Brewington
Attorney.

UNITED STATES PATENT OFFICE.

GIFFORD E. BLAYLOCK, OF BALTIMORE, MARYLAND.

TIRE-REPAIR METHOD.

1,281,757.

Specification of Letters Patent.  Patented Oct. 15, 1918.

Application filed July 8, 1918. Serial No. 243,896.

*To all whom it may concern:*

Be it known that I, GIFFORD E. BLAYLOCK, a citizen of the United States, residing at Baltimore city, State of Maryland, have invented certain new and useful Improvements in Tire-Repair Methods, of which the following is a specification.

This invention relates to methods of repairing the outer casings of pneumatic tires, and its object is to repair the casing in a simple and inexpensive manner, and to make repairs to the casing whereby it is again rendered serviceable, the repair leaving the casing as strong and durable as before, with no weak places at the seat of repair liable to give trouble in the future.

In order that the invention may be better understood, reference is had to the accompanying drawing forming a part of this specification, and in said drawing—

Figure 1 is an elevation of a fragment of a tire casing illustrating the preliminary step of the process:

Fig. 2 is a longitudinal section showing the completed repair, and

Fig. 3 is a cross-section on the line 3—3 of Fig. 2.

Referring specifically to the drawing, 5 denotes the tread of the tire casing which is attached to the fabric portion 6 in the usual manner. The invention shows a casing of standard construction and a detailed description thereof is therefore not necessary. To repair a blow-out, cut or other damage to the casing, the tread is first cut crosswise at the seat of the injury. This cut extends only to the fabric and each side is pulled back from four to eight inches according to the size of the injury, as shown as 7 in Fig. 1. The hole made by the cut or blow-out, is then skived round, or as near round as possible and tapered off toward the outside, taking off any loose fabric that may be present due to decay. The sides of the tread are then cut down over the beads from six to ten inches according to the size of the injury, and in doing this the chafing strip is pulled off at the beads. None of the fabric is stepped out no matter what the size of the hole or the tire may be. The tire is next buffed and cemented until it is glossy, whereupon the work of building up can be started.

The first step in building up the casing is to put a sheet 9 of new fabric on the inside of the casing over the seat of the injury, and the hole is then filled up with a quick-curing gum, the plug 10 being skived off even with the top of the fabric 6. A ply of fabric 11 is then brought across the top of the casing at the seat of the injury, over the plug 10, and down the sides of the casing over both beads 8 to the inside of the casing for a distance of from one to two inches. This fabric piece 11 is cut in lengths according to the size of the piece cut out over the beads. Next, a piece of cushion stock is placed over the top where the tread lies, as shown at 12, and the tread flaps 7 are folded down over the same, with a filler 13 of rubber for closing up the part which was cut away. The tire is now taken off the mandrel, and a three-ply patch is applied to the inside over the seat of injury, the size of the patch depending on the size of the injury. They may be used in lengths from six to twenty-two inches. The patch seats over the fabric strip or sheet 9. The three plies of the fabric patch as shown at 14, 15 and 16, respectively. The outer ply extends down as far as the beads 8 and over the inner ends of the strip 11, whereas the other plies are shorter, as shown in Fig. 2 and do not extend down this far. The tread portion removed from the sides of the tire between the two vertical edges shown in Fig. 1 is replaced by filling the space with raw rubber, which latter is vulcanized in the same manner as the hole or blow out is filled in, one vulcanizing operation serving for all the parts.

Where the injury is on one side of the casing, it is necessary to go over one bead only with a ply 11 of fabric, but where the injury is at the middle as shown in the drawing, the fabric is bound over both sides.

For making merely a reinforcement, the ply 11 is left off and only the three-ply inside patch is used.

It will be understood of course that the various patches, etc., are cemented in place, and then vulcanized.

A tire casing repaired as hereinbefore described is restored to its original strength and durability, and there are no weak places at the seat of the injury to give further trouble. The method is also easily carried out, and it is less expensive than other vulcanizing processes. The strip 11 serves to tie the filler 10 in place and as the ends of the strip are clamped by the three-ply patch on the inside of the casing, the strip is securely held and prevented from giving away.

I claim:

1. The method of repairing tire casings, which consists in cutting the tread crosswise to the beads and laying the same back at the seat of the injury to expose the fabric thereat, then trimming the hole in the fabric, then placing a backing strip on the inside of the casing over the hole, then closing the hole with a filler, then applying a fabric strip over the filled hole on the outside thereof and down the sides of the casing over the beads to the inside of the casing, then applying a patch to the inside of the casing over the backing strip, with the ends of the patch lapping over the ends of the second-mentioned strip on the inside of the casing, and also replacing the tread and repairing the same at the seat of its injury.

2. The method of repairing tire casings, which consists in applying a filler to the injured portion thereof, and a patch on the inside of the casing over the seat of the injury, with an outer tie strip beneath the tread and over the seat of the injury, the tie strip extending over the casing beads and into the inside of the casing, and its ends being overlapped by the ends of the patch.

3. The method of repairing tire casings, which consists in cutting the tread crosswise to the beads and laying the same back at the seat of the injury to expose the fabric thereat, then trimming the hole in the fabric, then placing a backing strip on the inside of the casing over the hole, then closing the hole with a filler, then applying a fabric strip over the filled hole on the outside thereof, then applying a patch to the inside of the casing over the backing strip, and also replacing the tread and repairing the same at the seat of its injury.

4. The method of repairing tire casings, which consists in applying a filler to the injured portion thereof, and a patch on the inside of the casing over the seat of the injury, with an outer tie strip beneath the tread and over the seat of the injury.

5. A patch for injured tire casings, comprising a backing strip on the inside of the casing over the seat of the injury, a filler for the injured portion, an outer fabric strip over the filler and extending down the sides of the casing over the beads to the inside of the casing, and a patch on the inside of the casing over the backing strip, the ends of the patch lapping over the ends of the second-mentioned strip on the inside of the casing.

6. A patch for injured tire casings, comprising a filler for the injured portion, a patch on the inside of the casing beneath the filler, and a tie strip beneath the tread over the filler, the tie strip extending over the casing beads and into the inside of the casing, and its ends being over-lapped by the ends of the patch.

In testimony whereof I affix my signature in the presence of two witnesses.

GIFFORD E. BLAYLOCK.

Witnesses:
E. WALTON BEWINGTON,
HOWARD D. ADAMS.